United States Patent
Tsunehara et al.

(10) Patent No.: US 7,016,653 B2
(45) Date of Patent: Mar. 21, 2006

(54) RADIO TERMINAL

(75) Inventors: Katsuhiko Tsunehara, Hachioji (JP); Mikio Kuwahara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 10/180,492

(22) Filed: Jun. 27, 2002

(65) Prior Publication Data

US 2003/0125026 A1    Jul. 3, 2003

(30) Foreign Application Priority Data

Dec. 28, 2001   (JP)   ............................. 2001-399979

(51) Int. Cl.
*H04B 1/00*   (2006.01)
(52) U.S. Cl. .................... 455/69; 455/522; 455/135; 370/335; 375/130
(58) Field of Classification Search ................ 455/522, 455/442, 69, 435, 436, 135; 375/130, 345; 370/335, 342, 252
See application file for complete search history.

(56) References Cited

U.S. PATENT DOCUMENTS

| | | | |
|---|---|---|---|
| 6,609,008 B1 * | 8/2003 | Whang et al. .............. | 455/522 |
| 6,721,350 B1 * | 4/2004 | Lomp .......................... | 375/130 |
| 6,816,473 B1 * | 11/2004 | Ozluturk et al. ............ | 370/335 |
| 2002/0009064 A1 * | 1/2002 | Blessent et al. ............ | 370/335 |
| 2003/0036361 A1 * | 2/2003 | Kawai et al. ................. | 455/69 |
| 2003/0060201 A1 * | 3/2003 | Soliman ...................... | 455/442 |

FOREIGN PATENT DOCUMENTS

| | | |
|---|---|---|
| JP | 07-181242 | 12/1993 |
| JP | 2001-166026 | 12/1999 |

* cited by examiner

*Primary Examiner*—Sonny Trinh
*Assistant Examiner*—Phuoc Doan
(74) *Attorney, Agent, or Firm*—Reed Smith LLP; Stanley P. Fisher, Esq.; Juan Carlos A. Marquez, Esq.

(57) ABSTRACT

A radio terminal that receives signals from a plurality of radio stations to calculate its current position has: interference canceling means for canceling each interference signal from the plurality of received signals; a plurality of delay profile generating means for generating delay profiles of the plurality of interference-canceled received signals with use of respective corresponding codes; and position calculating means for calculating its current position, which is a signal receiving point, with use of the plurality of delay profiles, whereby advantageously reducing the capacity of a memory mounted in the mobile terminal while the position calculation is speeded up

24 Claims, 11 Drawing Sheets

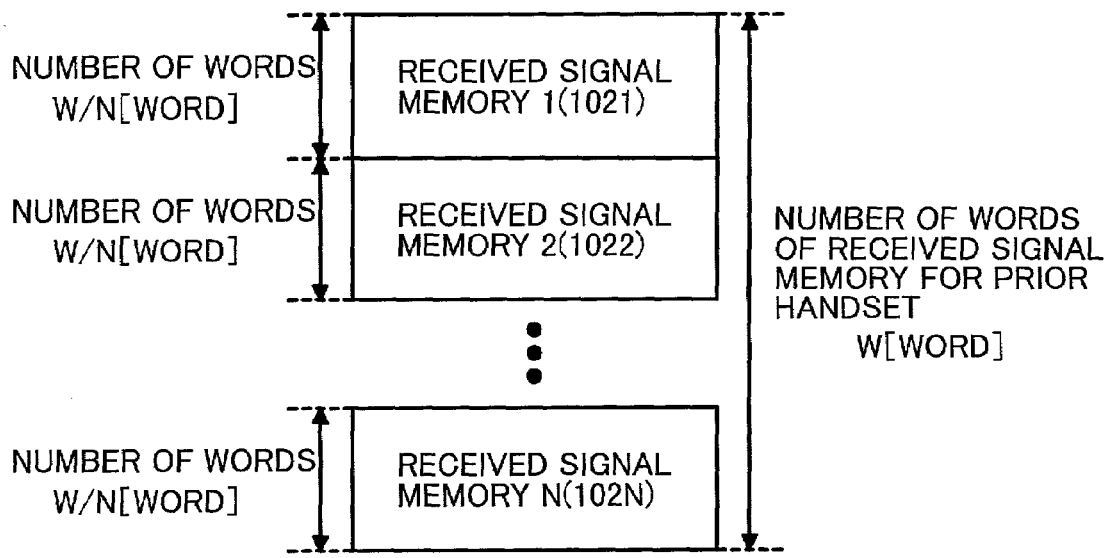
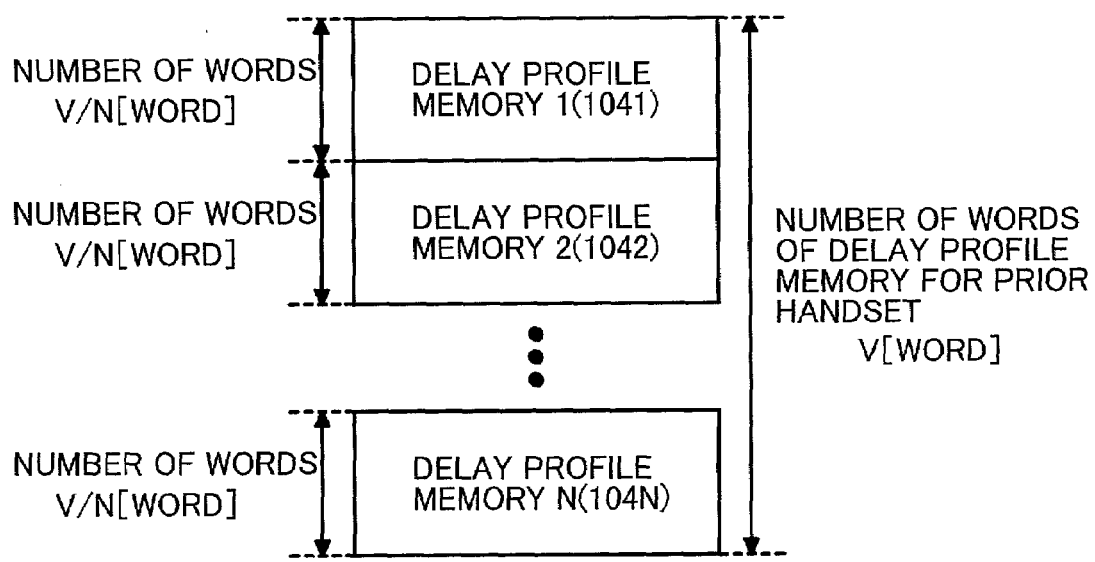

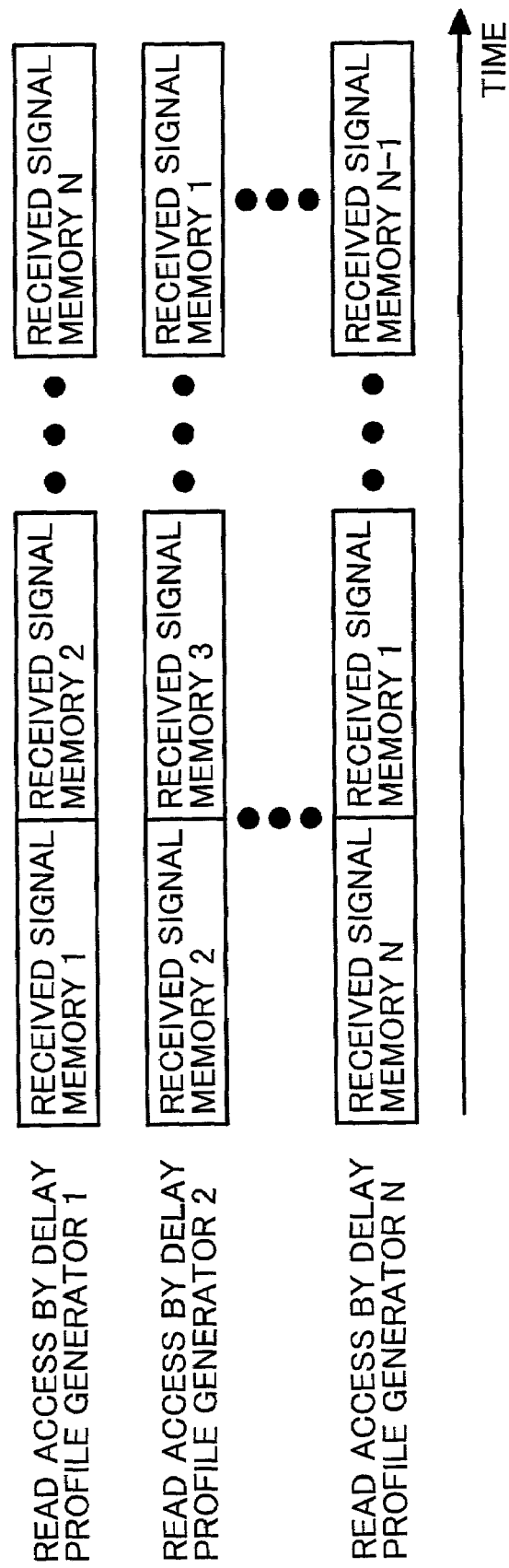

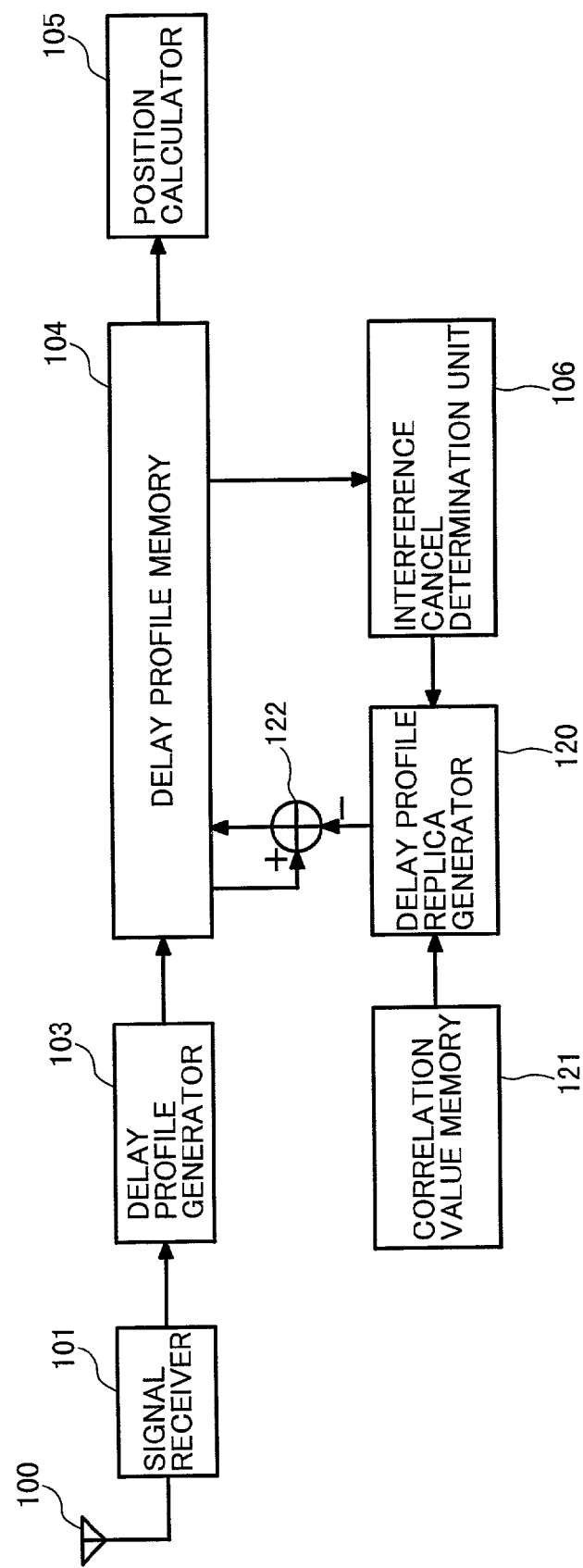

FIG.8

| ADDRESS | |
|---|---|
| 0 | VALUE OF $\sum_{t=0}^{K-1} P(t) \times P^*(t+0)$ |
| 1 | VALUE OF $\sum_{t=0}^{K-1} P(t) \times P^*(t+1)$ |
| 2 | VALUE OF $\sum_{t=0}^{K-1} P(t) \times P^*(t+2)$ |
| ⋮ | ⋮ |
| K-2 | VALUE OF $\sum_{t=0}^{K-1} P(t) \times P^*(t+K-2)$ |
| K-1 | VALUE OF $\sum_{t=0}^{K-1} P(t) \times P^*(t+K-1)$ |

FIG.9

| ADDRESS | |
|---|---|
| 0 | VALUE OF $\sum_{t=0}^{K-1} P(t) \times P^*(t+0)$ |
| 1 | VALUE OF $\sum_{t=0}^{K-1} P(t) \times P^*(t+1)$ |
| 2 | VALUE OF $\sum_{t=0}^{K-1} P(t) \times P^*(t+2)$ |
| ⋮ | ● ● ● |
| ceiling(K/2)-1 | VALUE OF $\sum_{t=0}^{K-1} P(t) \times P^*(t+ceiling(K/2)-1)$ |
| ceiling(K/2) | VALUE OF $\sum_{t=0}^{K-1} P(t) \times P^*(t+ceiling(K/2))$ |

FIG.11

| | MOBILE TERMINAL IN THE THIRD EMBODIMENT OF THE INVENTION | CONVENTIONAL MOBILE TERMINAL |
|---|---|---|
| LOGIC GATE | 1.3 | 1 |
| MEMORY | 0.35 | 1 |
| PROCESSING TIME | 0.35 | 1 |
| LSI DIE SIZE | 0.53 | 1 |

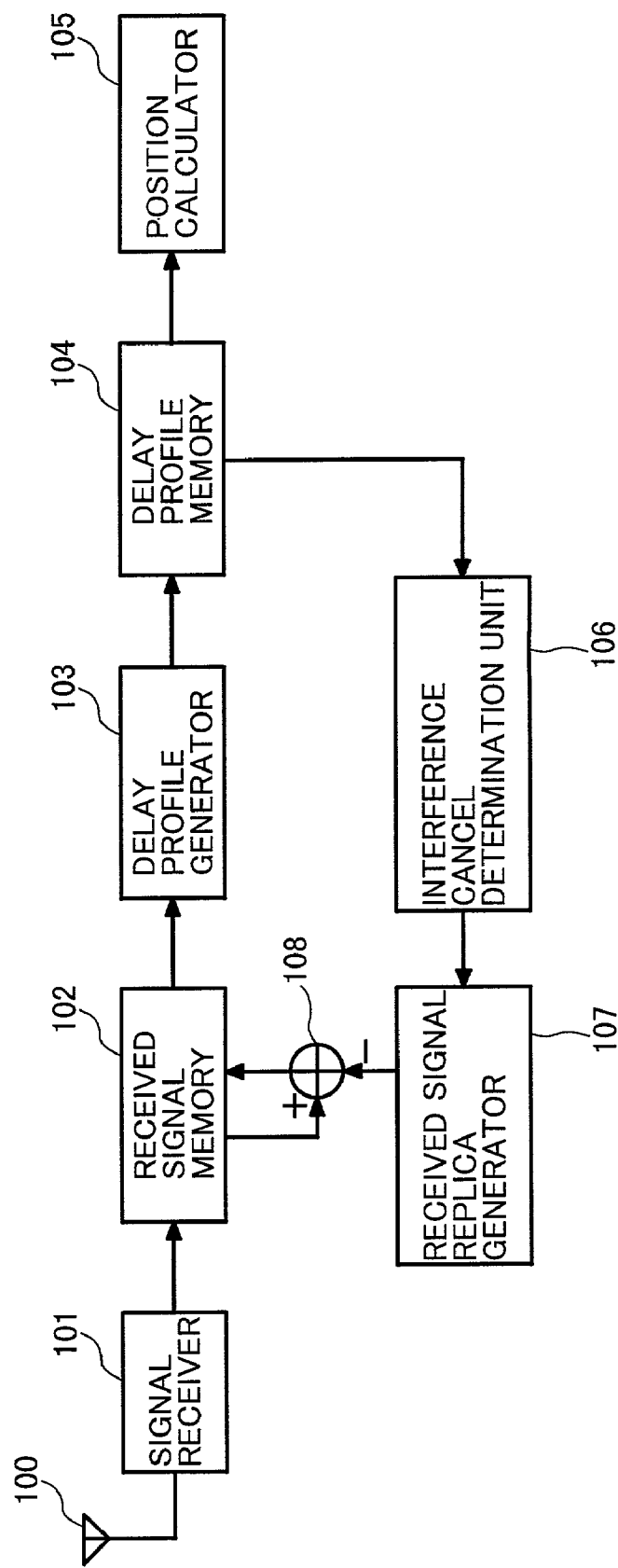

RADIO TERMINAL

BACKGROUND OF THE INVENTION

1. Field of the Invention

The present invention relates to a radio terminal that measures its current position with use of radio signals. More particularly, the invention relates to a radio terminal that can calculate a signal receiving point fast and reduce the chip area occupied by semiconductor elements used for the position measurement.

2. Description of Related Art

There have been proposed some techniques related to mobile communication systems; each technique enables respective mobile terminals to detect its current position with use of signals received from base stations in the mobile communication system. For example, JP-A 181242/1995 discloses a technique that measures a position of the subject mobile terminal with use of the position of each base station and a transmission delay time that differs among signals received from those base stations in a CDMA (Code Division Multiple Access) system.

In the case where this mobile terminal receives signals from three base stations, the distance between the mobile terminal and each of those base stations is often different, thereby the signal strength comes to differ among the signals output from those base stations to the mobile terminal. For example, when the mobile terminal positions very closely to a base station, the signal from the base station might be too strong. The signal output from the base station often causes a so-called near-far problem that interferes signals output from other base stations, thereby the receiving quality of the mobile terminal is degraded. If this near-far problem arises, the mobile terminal cannot receive signals from the necessary number of base stations to calculate its current position. In other words, the mobile terminal is disabled to accurately calculate so as to know its current position in an area where the near-far problem has arisen. In order to solve this problem, a method for canceling the interference is proposed, for example, in JP-A No. 166026/2001.

FIG. 12 shows a block diagram of this conventional mobile terminal. A cellular signal received from a base station via an antenna 100 is sent to a signal receiver 101, then subjected to such processings as a receiving processing with a radio/intermediate frequency, base band signal demodulation, A/D conversion, etc. to generate a digital signal. The received signal generated by the signal receiver 101 is stored in a received signal memory 102. The received signal stored in the received signal memory 102 is then inputted to a delay profile generator 103. The delay profile generator 103 generates a delay profile from a received signal stored in the received signal memory 102 with use of, for example, a matched filter. The delay profile generated by the delay profile generator 103 is then written in a delay profile memory 104 and retained there. The delay profile written in the delay profile memory 104 is inputted to both of a position calculator 105 and an interference cancel determination unit 106.

The interference cancel determination unit 106 uses the delay profile stored in the delay profile memory 104 to determine whether to cancel a signal received at a time as an interference one. A received signal replica generator 107 determines an amplitude value of a replica of a received signal with use of the delay profile with respect to the timing at which interference cancellation is required. An adder 108 subtracts the replica of the received signal calculated by the received signal replica generator 107 from the received signal read from the received signal memory 102 to generate an interference-canceled received signal, then writes the signal in the received signal memory 102.

The position calculator 105 calculates the current position of the mobile terminal with use of the interference-canceled delay signals retained in the delay profile memory 104.

In the case of the conventional mobile terminal described above, many calculations are required to generate a delay profile in the delay profile generator 103. For example, in the case of a TIA/EIA/IS-95 system, which is a cellular system that employs the CDMA method, the system needs about $10^8$ calculation circuits. In addition, when consideration is taken to the time to access the received signal memory 102, it takes several tens of seconds to generate a delay profile in the delay profile generator 103. When it takes such a long time to generate a delay profile, the response of position measurement slows down, resulting in the degradation of the serviceability of position information.

The conventional mobile terminal requires a large capacity received signal memory. For example, if the TIA/EIA/IS-95 system has a received signal memory for storing both inphase and quadrature components of received signals for one frame and corresponding to a bit width effective for interference cancellation, the memory needs a capacity of about $10^6$ bits. The received signal memory needs a larger capacity to improve the position measurement accuracy and the quality of received signals. Providing the mobile terminal with such a large capacity memory will cause the mobile terminal to be expanded in size, thereby the portability will be lowered and the manufacturing cost will increase.

SUMMARY OF THE INVENTION

Under the circumstances, it is an object of the present invention to provide a mobile terminal that can reduce the capacity of its memory while the position measurement is speeded up.

In one aspect, we utilize the radio terminal comprising: interference canceling means for canceling the interference component from among signals received from a plurality of radio stations; a plurality of delay profile generating means for generating delay profiles of the plurality of interference-canceled received signals in parallel; and position measuring means for measuring a position that is a signal receiving point with use of the delay profiles.

In another aspect, we utilize the radio terminal comprising: delay profile generating means for generating a delay profile of each of the signals received from the plurality of radio stations; delay profile retaining means for retaining delay profiles generated by the delay profile generating means; interference canceling means for canceling the interference component from among the delay profiles; and position calculating means for calculating a position that is a signal receiving point with use of interference-canceled delay profiles retained in the delay profile retaining means.

In still another aspect, we utilize the radio terminal comprising: a plurality of delay profile generating means for generating delay profiles of the signals received from the plurality of radio stations in parallel with use of their corresponding codes; interference canceling means for canceling the interference component from among the delay profiles; and position calculating means for calculating a position that is a signal receiving point with use of interference-canceled delay profiles.

In yet another aspect, we utilize the semiconductor device for a radio terminal that calculates its current position with use of signals received from a plurality of radio stations. The semiconductor device comprises a plurality of delay profile generating means for generating delay profiles of the signals received from the plurality of radio stations in parallel with use of their corresponding codes; delay profile replica generating means for generating a replica of each delay profile to be canceled as an interference one from the delay profiles; calculating means for canceling the interference component from among the delay profiles according to a result of calculation of the replica of each delay profile generated by the delay profile replica generating means and each delay profile generated by the delay profile generating means; and position calculating means for calculating a position that is a signal receiving point with use of the interference-canceled delay profiles.

The radio terminal of the invention, because it is provided with a plurality of delay profile generating means such way, makes it possible to generate a plurality of delay profiles in parallel. This allows the position measuring time to be reduced and thereby improves the serviceability of position information.

Further, the radio terminal of the invention, because it is provided with correlation value retaining means for retaining a correlation value of each spreading code sequence, makes it possible to generate a replica of each delay profile with use of the correlation value so as to subtract the replica from the delay profile of another base station and cancel each interference component. This allows the received signal memory to be eliminated from the subject mobile terminal, and thereby reducing the hardware items, specifically the memory capacity in the mobile terminal provided with position measuring functions.

Other and further objects, features and advantages of the invention will appear more fully from the following description

BRIEF DESCRIPTION OF THE DRAWINGS

A preferred form of the invention is illustrated in the accompanying drawings in which:

FIG. 3 is a configuration of a received signal memory composed of a plurality of memories 1 to N;

FIG. 4 is an illustration for describing how a memory controller controls profile generators;

FIG. 5 is a configuration of a delay profile memory composed of a plurality of memories 1 to N;

FIG. 7 is a block diagram of a mobile terminal in the second embodiment of the invention;

FIG. 8 is a configuration of a correlation value memory in the second embodiment of the invention;

FIG. 9 is another configuration of the correlation value memory in the second embodiment of the invention;

FIG. 11 is a table for describing sizes of an LSI in the third embodiment of the invention; and FIG. 12 is a block diagram of a conventional mobile terminal.

DETAILED DESCRIPTION OF THE PREFERRED EMBODIMENTS

Next, the preferred embodiments of a mobile communication system of the invention, which uses the TIA/EIA/IS-95 method, will be described with reference to the accompanying drawings.

Figure 1:
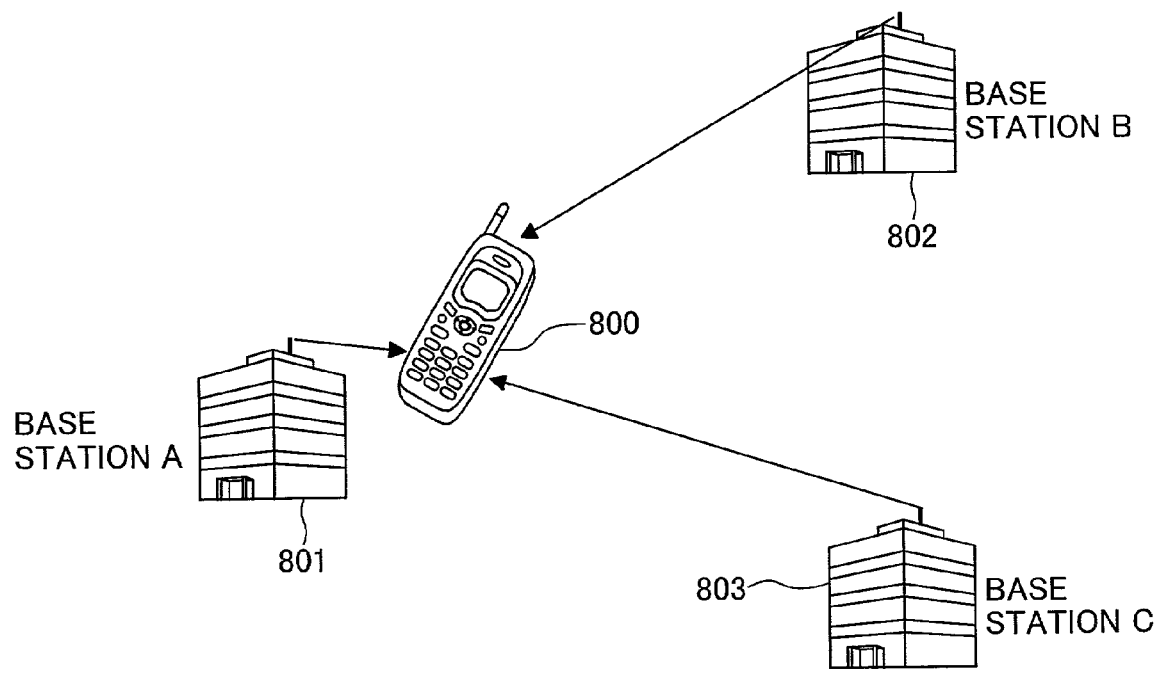
FIG. 1 is a configuration of a radio system in an embodiment of the invention.

FIG. 1 shows a block diagram of a radio system (mobile communication system) in which a mobile terminal in an embodiment of the invention measures its position.

In FIG. 1, cellular radio base stations 801 to 803 are provided around a mobile terminal 800, which is typically a portable telephone. The radio base stations 801 to 803 are used for communicating with the mobile terminal 800. A unique PN offset value is assigned to each of those base stations 801 to 803.

In this embodiment of the invention, the mobile terminal 800 receives signals from at least three base stations to measure a difference of the transmission distance among the signals received from those three base stations. The positions of those three base stations are used as known values for measuring the current position of the mobile terminal 800.

Figure 2:
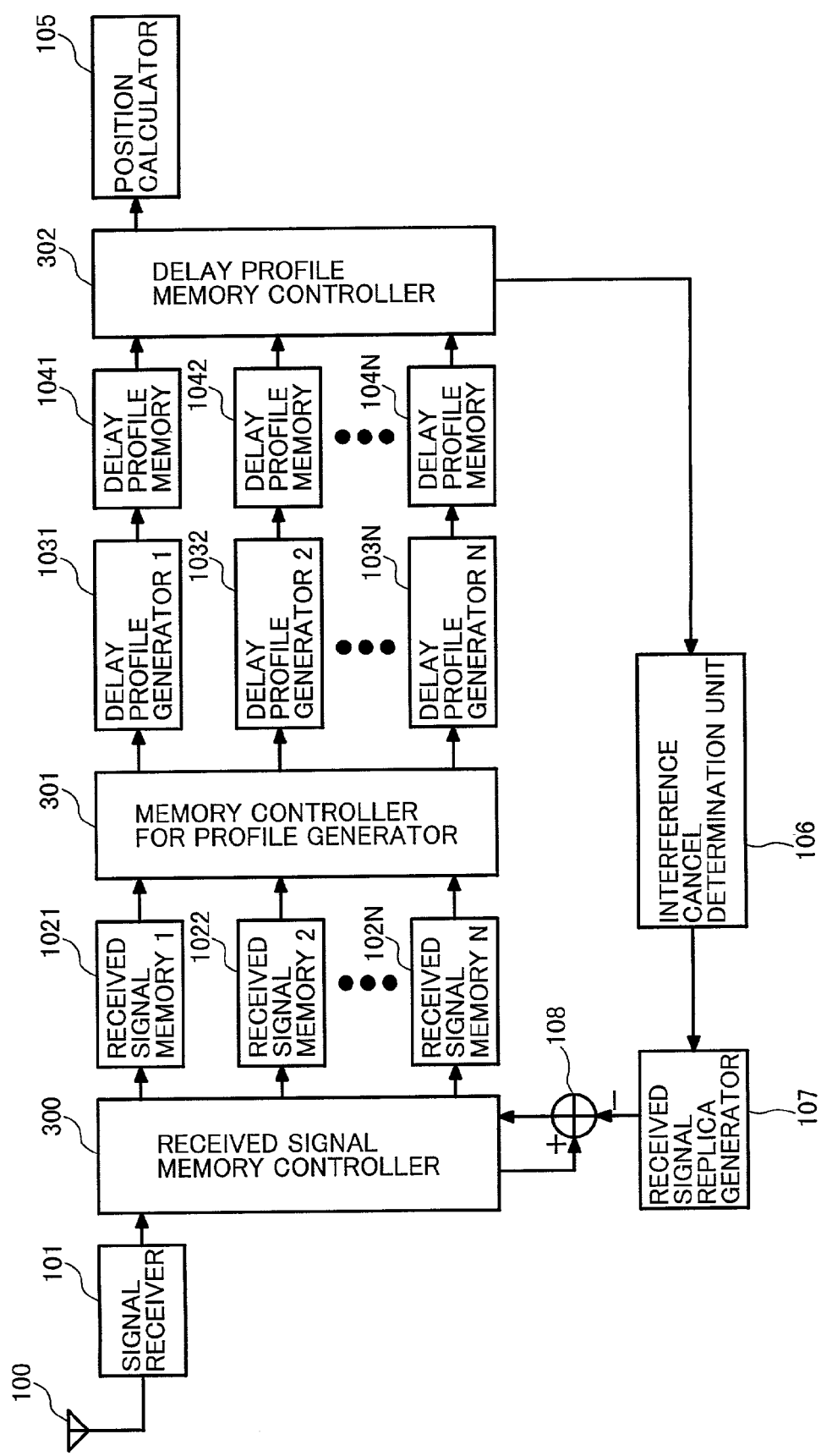
FIG. 2 is a block diagram of a mobile terminal in the first embodiment of the invention.

FIG. 2 is a block diagram of a mobile terminal in the first embodiment of the invention. In FIG. 2, the same reference numerals are used for the same functional items as those of the conventional mobile terminal shown in FIG. 12.

Signals received from base stations via the antenna 100 are sent to a signal receiver 101. The signal receiver 101 is composed of a radio part (receiver and transmitter), a base band processing part, etc. The radio part performs such receiving processings as amplification, frequency conversion, etc. of high and intermediate signals for cellular signals received from the base stations via the antenna 100 and the base band processing part performs such processings as demodulation, AD (Analog to Digital) conversion, etc. of base band signals to generate received signals. Received signals generated by the signal receiver 101 are written in the received signal memories 1021 to 102N sequentially via the received signal memory controller 300. The received signals written in the received signal memories 1021 to 102N are read by the delay profile generators 1031 to 103N via the profile generation memory controller 301, then inputted to the delay profile generators 1031 to 103N (see FIGS. 3 and, 4). In other words, each of the received signal memories 1021 to 102N is divided into a plurality of areas (or composed of a plurality of memories) and the plurality of different areas (or different memories) are configured so as to be accessed concurrently for reading/writing. The received signal memory controller 300 and the profile generation memory controller 301 manage writing/reading in/from those received signal memories 1021 to 102N, as well as accesses to the received signal memories 1021 to 102N. Concretely, the received signal memory controller 300 controls data write accesses of the signal receiver 101 to the received signal memories 1021 to 102N. The profile generation memory controller 301 controls data read accesses of the delay profile generators 1031 to 103N to the received signal memories 1021 to 102N.

Each of the delay profile generators 1031 to 103N includes, for example, a matched filter and is enabled to calculate a correlation value between a received signal and a spreading code sequence at each receiving timing to generate a delay profile that denotes a value corresponding to the correlation value.

Next, a description will be made for a digital mobile system that adopts the CDMA method of USA and conforms to the ETA/TIA-95, which is the standard regulated by the TIA (Telecommunication Industry Association). In the case of the ETA/TIA-95, all the base stations use the same spreading code (PN code) whose cycle is 26.7 msec. Each base station has its unique pilot PN offset (PN offset value) assigned beforehand thereto so as to be used as a transmission time difference to identify itself and each base station shifts each signal to be output just by the PN offset value from the standard timing.

A mobile terminal calculates a correlation value between a received signal and the PN code to obtain the delay profile of each base station. For example, the mobile terminal, after calculating the correlation value between the received signal and the PN code with use of a matched filter, obtains a delay profile waveform output from the matched filter.

A delay profile generated by a delay profile generator (1031 to 103N) is written in a delay profile memory (1014 to 104N) and retained there. Each delay profile memory (1041 to 104N) is prepared so as to have its corresponding delay profile generator (1031 to 103N). Delay profiles retained in a delay profile memory (1041 to 104N) are read by the position calculator 105 and the interference determination unit 106 via the delay profile memory controller 302 respectively, then inputted to the position calculator 105 and the interference determination unit 106.

The interference cancel determination unit 106 uses a delay profile stored in the target delay profile memory (1041 to 104N) to extract both inphase and quadrature components of the delay profile to obtain a delay profile power value. The power value is then compared with a predetermined threshold value to determine whether to cancel a signal received at a time as an interference one (see FIG. 6).

The received signal replica generator 107 determines an amplitude of the received signal replica according to the values of the inphase component 200 and the quadrature component 201 of the delay profile at the timing at which the interference cancel determination unit 106 has determined to cancel the signal from the received signals as an interference one. The received signal replica generator 107 then generates a replica of the received signal according to the determined amplitude of the received signal replica. In other words, the received signal replica generator 107 calculates the intensity of each received signal stored in the received signal memory 102 and to be canceled as an interference one.

The adder 108 reads a received signal stored in the received signal memory (1021 to 102N) to subtract the received signal replica generated by the received signal replica generator 107 from this received signal to generate an interference-canceled received signal, then stores the received signal in the received signal memory (1021 to 102N) again.

Hereinafter, a description will be made for an example of the procedure for performing the interference cancellation. A mobile terminal generates a delay profile of the first base station, then generates a replica of the received signal from the delay profile, then subtracts the replica from the received signal. Thus, the received signal obtained such way has already canceled the interference component received from the first base station. Consequently, this received signal can be used to generate a delay profile of the second base station, thereby the interference of the first base station can be eliminated from the delay profile of the second base station. By repeating the operations, the interference of the first and second base stations can be eliminated to obtain the delay profile of the third base station. Then, the interference components of the first to third base stations can be canceled to obtain the delay profile of the fourth base station. Such way, the mobile terminal shown in FIG. 2 can realize interference cancellation to eliminate interference signals from nearby base stations to solve the so-called near-far problem.

The CPU of the position calculator 105 is composed of such elements as a memory required for calculation and performs processings required for position calculation with use of the delay profiles retained in the delay profile memories 1041 to 104N under the control of the software stored in the memory. In other words, the position calculator 105 calculates to obtain the current position of the mobile terminal, which is a receiving point, with use of the delay profiles obtained by canceling interference signals in the above procedure. The position calculator 105 uses, for example, the trilateration principle disclosed in JP-A No. 181242/1995 for the position calculation.

Concretely, the mobile terminal can be composed of a received signal memory controller 300, received signal memories 1021 to 102N, a memory controller for profile generator 301, delay profile generators 1031 to 103N, a delay profile memory controller 302, and a received signal replica generator 107 that are all integrated into one semiconductor device (LSI) connected to a CPU used for position calculation. An interference cancel determination unit 106 may be added to the above configuration of the LSI. In addition, the position calculator 105 may also be added in the LSI.

FIG. 3 shows a configuration of the received signal memory composed of received signal memories 1 (1021) to N (102N).

If the number of words (the number of addresses) in the received signal memory 102 required for the above described conventional mobile terminal (FIG. 12) is assumed as W [words], the number of words in each of the received signal memories 1 to N becomes W/N [words], since the received signal memory 102 is divided into N areas in the mobile terminal in the first embodiment.

The received signal memory controller 300 begins writing of received signals generated by the signal receiver 101 in the start address of the received signal memory 1. The received signal memory controller 300, when ending the writing in the last address of the received signal memory 1, continues the writing of received signals in the start address of the received signal memory 2. After writing of received signals in the last address of the received signal memory 2, the received signal memory controller 300 further continues the writing in the start address of the received signal memory 3. The received signal memory controller 300 repeats the writing of the received signals generated by the signal receiver 101 in those received signal memories sequentially from 1 to N. Under the control of the received signal memory controller 300, the signal receiver 101 comes to handle received signal memories 1 to N, each having a W/N [word] address space as one memory having a W [word] address space.

Similarly, the received signal memory controller 300 also controls the accesses of the received signal replica generator 107 to the received signal memories 1 to N via the adder 108. The received signal replica generator 107 thus decodes addresses under the control of the received signal memory controller 300 so as to handle the received signal memories 1 to N as one memory having a W [word] address space.

FIG. 4 shows an example of access controlling by the memory controller for profile generator 301.

The memory controller for profile generator 301 controls received signal read accesses of the delay profile generators 1 (1031) to N (103N) to the received signal memories 1 to N. The memory controller for profile generator 301 controls those accesses of the delay profile generator 1 so as to be done sequentially in an ascending order of memory numbers 1, 2, 3, . . . N. Similarly, the memory controller for profile generator 301 controls the accesses of the delay profile generator 2 so as to be done sequentially in a cyclical order of memory numbers 2, 3, 4, . . . N, 1. Similarly, the memory controller for profile generator 301 controls the accesses of the delay profile generator N to the received signal memories so as to be done sequentially in an order of memory numbers N, 1, 2, 3, . . . N-1.

By controlling the accesses of each delay profile generator to each received signal memory such way, it is avoided that the same area of the received signal memory is accessed by a plurality of delay profile generators. Consequently, each received signal memory is accessed for reading only from one delay profile generator. As a result, there is no need to speed up the accesses to the received signal memories 1 to N, thereby the received signal memory can be composed of low-price memories.

FIG. 5 shows a configuration of a delay profile memory 104 composed of memories 1 (1041) to N (104N).

If the number of words (the number of addresses) of the delay profile memory 104 required for the above described conventional mobile terminal (FIG. 12) is assumed as V[words], the number of words in each of the delay profile memories 1 to N comes to become V/N [words], since the mobile terminal in the first embodiment (FIG. 2) is divided into N areas.

Delay profiles generated by the delay profile generators 1 (1031) to N (103N) are written in their corresponding delay profile memories 1 (1041) to N (104N) respectively. In other words, one delay profile data generated by each of the profile generators 1031 to 103N is written in each of the delay profile memories 1041 to 104N.

The delay profile memory controller 302 functions just like the received signal memory controller 300 to decode addresses so that the position calculator 105 and the interference cancel determination unit 106 can handle delay profile memories 1 to N, each having a V/N [word] address space, as one memory having a V[word] address space.

Figure 6A:
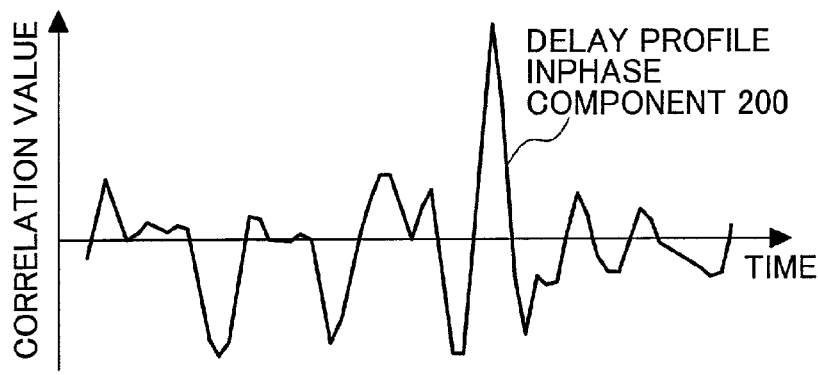
FIGS. 6A, 6B, 6C are illustrations for describing whether to make interference cancellation from a delay profile in the first embodiment of the invention.
Figure 6B:
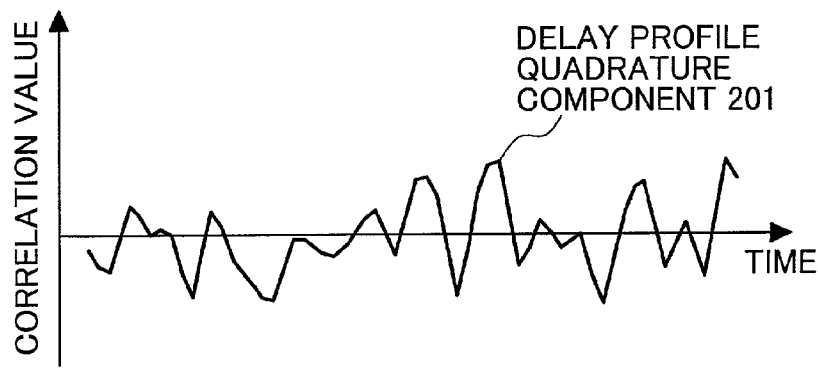
Figure 6C:
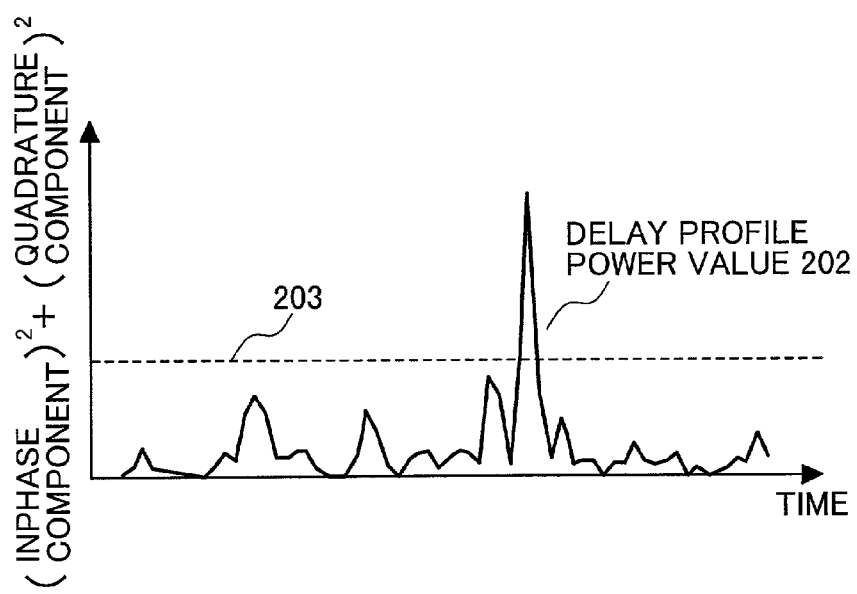

FIGS. 6A, 6B, 6C show how interference cancellation is determined.

The interference cancel determination unit 106 extracts both inphase component 200 and quadrature component 201 from each delay profile retained in the delay profile memories 1041 to 104N to calculate (inphase component)$^2$+ (quadrature component)$^2$ to obtain a delay profile power value 202 at each timing. FIG. 6A shows this inphase component 200 and FIG. 6B shows the quadrature component 201. FIG. 6C shows the delay profile power value 202. The interference cancel determination unit 106 compares the delay profile power value 202 with the predetermined threshold value 203 to determine a timing at which the delay profile power value exceeds the threshold value, then determines performing of interference cancellation at the timing and not performing of the interference cancellation at any timing at which the delay profile power value is less than the threshold value. This threshold value 203 is determined, for example, by multiplying the maximum value of the delay profile power value by a predetermined coefficient.

As described above, because the mobile terminal in the first embodiment is provided with a plurality of delay profile generators 1031 to 103N, a plurality of delay profiles can be processed in parallel. Consequently, the position calculation time can be reduced, thereby the serviceability of position information can be improved.

FIG. 7 shows a block diagram of a mobile terminal in the second embodiment of the invention. In FIG. 7, the same reference numerals are used for the same functional items as those of the conventional mobile terminal (FIG. 12) and the mobile terminal (FIG. 2) in the first embodiment.

Signals received from base stations via the antenna 100 are sent to the signal receiver 101. The signal receiver 101 is composed of a radio part (receiver and transmitter), a base band processing part, etc. The radio part performs such receiving processings as amplification, frequency conversion, etc. of high and intermediate signals for cellular signals received from the base stations via the antenna 100 and the base band processing part performs such processings as demodulation, AD (Analog to Digital) conversion, etc. of base band signals to generate received signals. Received signals generated by the signal receiver 101 are inputted to the received signal generator 103 directly without being stored in the received signal memory.

Delay profile generator 103 includes, for example, a matched filter and is enabled to calculate a correlation value between a received signal and a spreading code sequence at each receiving timing to generate a delay profile that denotes a value corresponding to the correlation value.

A delay profile generated by a delay profile generator 103 is written in the delay profile memory 104 and retained there. The delay profile retained in the delay profile memory 104 is read by the position calculator 105 and the interference determination unit 106, then inputted to the position calculator 105 and the interference determination unit 106 respectively.

The interference cancel determination unit 106 uses a delay profile stored in the target delay profile memory 104 to obtain a delay profile power value. The power value is then compared with a predetermined threshold value to determine whether to perform interference cancellation. The same method as that used in the mobile terminal in the first embodiment (FIG. 6) can be used for this comparison.

The delay profile replica generator 120 estimates whether or not a signal output at a timing at which the interference cancel determination unit 106 has determined performing of interference cancellation might interfere the result of the calculation of the correlation value at another timing, then outputs the result. In other words, the delay profile replica generator 120 generates a replica of a target delay profile to be canceled as an interference one.

The correlation value memory 121 stores K correlation values of a spreading code sequence whose cycle is a spreading factor K.

The adder 122 reads a delay profile from the delay profile memory 104 and subtracts the replica of the delay profile calculated by the delay profile replica generator 120 from this delay profile to generate an interference-canceled delay profile, then writes the profile in the delay profile memory 104 again.

The CPU of the position calculator 105 is composed of such elements as a memory required for calculation and performs processings required for position calculation with use of delay profiles retained in the delay profile memory 104 under the control of the software stored in the memory. In other words, the position calculator 105 calculates the current position of the mobile terminal, which is a signal receiving point, with use of interference-canceled delay profiles in the procedure to be described later.

Next, a description will be made for the operation of the mobile terminal 800 that is positioned closely to the base station A and enabled to calculate its current position with use of a signal from the base station A, as well as signals received from the far-away base stations B and C as an example of the procedure for interference cancellation in the mobile terminal shown in FIG. 7.

The signal receiver 101 generates a received signal S(t). The S(t) is represented by a complex prime number. The real part represents the inphase component of the received signal and the imaginary part represents the quadrature component of the received signal. The S(t) is represented by the expression 1 as shown below. To simplify the description, only the pilot channel component is described and description for other channel components and noise components are omitted here.

$$S(t) = S_A(t) + S_B(t) + S_C(t) \quad \text{[Expression 1]}$$

In the above expression 1, the complex prime number $S_x(t)$ denotes a signal output from the base station X(X=A, B, or C).

The $S_x(t)$ is also represented by the expression 2 as follows.

$$S_X(t) = P(t+T_X) \times R_X \times e^{j\theta_X} \quad \text{[Expression 2]}$$

Here, the complex $P(t+T_x)$ denotes a spreading code sequence having a phase $T_x$ at the standard timing (t=0). The real number Rx denotes an amplitude of the received signal and the complex prime number $e^{j\theta_x}$ denotes the phase component of the received signal.

When consideration is taken for the expression 1, each of $M(T_A)$ and $M(T_B)$ is a prime number and both of $M(T_A)$ and $M(T_B)$ are represented by the expressions 3 and 4 as follows. The $M(T_A)$ and $M(T_B)$ are results of correlation value calculations at the timing $T_A$ corresponding to the base station A and at the timing of $T_B$ corresponding to the base station B.

$$M(T_A) = \sum_{t=0}^{K-1} s(t) \times P^*(t+T_A) \quad \text{[Expression 3]}$$

$$= \sum_{t=0}^{K-1} \{s_A(t) + s_B(t) + s_C(t)\} \times P^*(t+T_A)$$

$$M(T_B) = \sum_{t=0}^{K-1} s(t) \times P^*(t+T_B) \quad \text{[Expression 4]}$$

$$= \sum_{t=0}^{K-1} \{s_A(t) + s_B(t) + s_C(t)\} \times P^*(t+T_B)$$

Here, the real number K denotes a total (spreading factor) of the calculated correlation values and the asterisk * denotes a complex conjugate.

The expressions 3 and 4, when the expression 2 is used, can be replaced with the expressions 5 and 6 respectively as follows.

$$M(T_A) = \sum_{t=0}^{K-1} P(t+T_A) \times R_A \times e^{j\theta_A} \times P^*(t+T_A) + \quad \text{[Expression 5]}$$

$$\sum_{t=0}^{K-1} P(t+T_B) \times R_B \times e^{j\theta_B} \times P^*(t+T_A) +$$

$$\sum_{t=0}^{K-1} P(t+T_C) \times R_C \times e^{j\theta_C} \times P^*(t+T_A)$$

$$= 2K \times R_A \times e^{j\theta_A} +$$

$$\sum_{t=0}^{K-1} P(t+T_B) \times R_B \times e^{j\theta_B} \times P^*(t+T_A) +$$

$$\sum_{t=0}^{K-1} P(t+T_C) \times R_C \times e^{j\theta_C} \times P^*(t+T_A)$$

$$M(T_B) = \sum_{t=0}^{K-1} P(t+T_A) \times R_A \times e^{j\theta_A} \times P^*(t+T_B) + \quad \text{[Expression 6]}$$

$$\sum_{t=0}^{K-1} P(t+T_B) \times R_B \times e^{j\theta_B} \times P^*(t+T_B) +$$

$$\sum_{t=0}^{K-1} P(t+T_C) \times R_C \times e^{j\theta_C} \times P^*(t+T_B)$$

$$= \sum_{t=0}^{K-1} P(t+T_A) \times R_A \times e^{j\theta_A} \times P^*(t+T_B) +$$

$$2K \times R_B \times e^{j\theta_B} +$$

$$\sum_{t=0}^{K-1} P(t+T_C) \times R_C \times e^{j\theta_C} \times P^*(t+T_B)$$

Here, the real number and the imaginary component of this spreading factor P(t) become +1 or −1 respectively.

The interference cancel determination unit 106 calculates (inphase component)$^2$+(quadrature component)$^2$ with use of both inphase and quadrature components of a delay profile stored in the delay profile memory 104 to obtain a delay profile power value. The interference cancel determination unit 106 then compares the delay profile power value with a predetermined threshold value at each timing to determine performing of interference cancellation at a timing at which the delay profile power value is higher than the threshold value and not performing at a timing at which the delay profile power value is lower than the threshold value (see FIG. 6).

Next, a description will be made for the operation of the delay profile replica generator 120 in this embodiment to estimate interference of a signal (a signal at the timing $T_A$) output from the base station A to be exerted on a signal (a signal at the timing $T_B$) output from the base station B.

In the expression 6 that denotes a result of the correlation value calculation at the timing $T_B$, the second part on the right side denotes a signal output from the base station B, that is, a correlation value corresponding to a desired wave and the first part on the right side denotes a signal output from the base station A, that is, a correlation value corresponding to an interference wave. The delay profile replica generator 120 estimates the first term on the right side in the above expression 6 with use of the result $M(T_A)$ of the correlation value calculation at the timing $T_A$ shown in the expression 5.

Because the mobile terminal 800 exists closely to the base station A (see FIG. 1) in this case, the amplitude value $R_A$ of the received signal is far larger than that $R_B$ of the received signal and the amplitude $R_A$ of the received signal becomes far larger than that $R_c$ of the received signal. The relationship among $R_A$, $R_B$, and $R_c$ in the expression 7 is thus satisfied as shown below.

$$R_A \gg R_B, R_A \gg R_C \qquad \text{[Expression 7]}$$

In addition to the expression 7, the approximation of the $M(TA)$ in the expression 5 is also as shown in the expression 8 when a correlation value of a spreading code sequence takes a small value at the time of phase unmatching.

$$M(T_A) \cong 2K \times R_A \times e^{j\theta_A} \qquad \text{[Expression 8]}$$

The first term on the right side in the expression 6 is represented by the expression 9 when the expression 8 is used.

(First term on the right side in the expression 6) = [Expression 9]

$$\frac{1}{2K} \times M(T_A) \times \left\{ \sum_{t=0}^{K-1} P(t+T_A) \times P^*(t+T_B) \right\}$$

When the spreading factor K and the cycle of the spreading code sequence are set equally, the term in { } in the expression 9 is represented by the expression 10 as shown below.

$$\sum_{t=0}^{K-1} P(t+T_A) \times P^*(t+T_B) = \sum_{t=0}^{K-1} P(t) \times P^*(t+L) \qquad \text{[Expression 10]}$$

Here, $L=T_B-T_A$ is satisfied. Because the spreading factor K and the cycle of the spreading factor sequence are set equally, the L value becomes any of 0, 1, . . . K−1. Consequently, the correlation value to be obtained from the expression 10 can be calculated beforehand with respect to every L value.

FIG. 8 shows a method for storing correlation values in the correlation value memory 121. According to this storing method shown in FIG. 8, the correlation values (shown on the right side in the expression 10) are stored in the ascending order of L values assumed as addresses between L=0 and L=K−1.

FIG. 9 shows another method for storing correlation values in the correlation value memory 121. The method shown in FIG. 9 can reduce the capacity of the correlation value memory 121 required to store the correlation values to a half of that employed by the method shown in FIG. 8.

When the spreading factor K and the cycle of the spreading code sequence are set equally in the expression 10, the expression 11 is satisfied as follows.

$$\sum_{t=0}^{K-1} P(t) \times P^*(t+K-L') = \left( \sum_{t=0}^{K-1} P(t) \times P^*(t+L') \right)^* \qquad \text{[Expression 11]}$$

Here, L' is assumed to be any of 1, 2, . . . ceiling (K/2). The ceiling(x) is a function that gives the minimum integer over x.

The correlation value, when L is assumed to be any of ceiling (K/2)+1, ceiling (K/2)+2, . . . , K−1 in the expression 10, can be obtained from each of the correlation values of ceiling (K/2)−1, ceiling (K/2)−2, . . . 1 when the K value is even. When the K value is odd, the correlation value can be obtained from any of ceiling (K/2)−2, ceiling (K/2)−3, . . . 1. When this method is used, correlation values are stored in the correlation value memory 121 as shown in FIG. 9. This is why this method can reduce the capacity of the correlation value memory 121 required for storing correlation values to the half of that of the method shown in FIG. 8.

As shown in the expressions 9 and 10, the delay profile replica generator 120 can use a result of the correlation calculation $M(T_A)$ stored in the delay profile memory 104, a correlation value corresponding to the timing difference (phase difference) $T_B-T_A$, and a preset spreading factor K to calculate the interference (the first term on the right side in the expression 6) of the signal output from the base station A to be exerted on the signal output from the base station B.

The above processings are performed at each timing of each delay profile of the base station B and similar processings are also performed for each delay profile of the base station C. Consequently, it is possible to store delay profiles of both base stations B and C in the delay profile memory 104. At this time, the interference of a signal output from the base station A is already canceled from among the profiles of those base stations B and C.

The adder 122 reads the $M(T_B)$ represented by the expression 6 from the delay profile memory 104, then subtracts the first term on the right side in the expression 6 calculated by the delay profile replica generator 120 from the $M(T_B)$ to generate the $M'(T_B)$, then writes the $M'(T_B)$ in the delay profile memory 104.

Such way, the mobile terminal in the second embodiment, provided with the correlation value memory 121 and the delay profile replica generator 120, can generate a replica of each delay profile with use of the correlation value stored in the correlation value memory 121 and subtract the replica from the delay profile of another base station to make interference cancellation. The mobile terminal can thus be configured without using any received signal memory, thereby the hardware scale, especially the memory capacity of the mobile terminal provided with positioning functions can be reduced and the mobile terminal can be reduced in both size and price.

Figure 10:
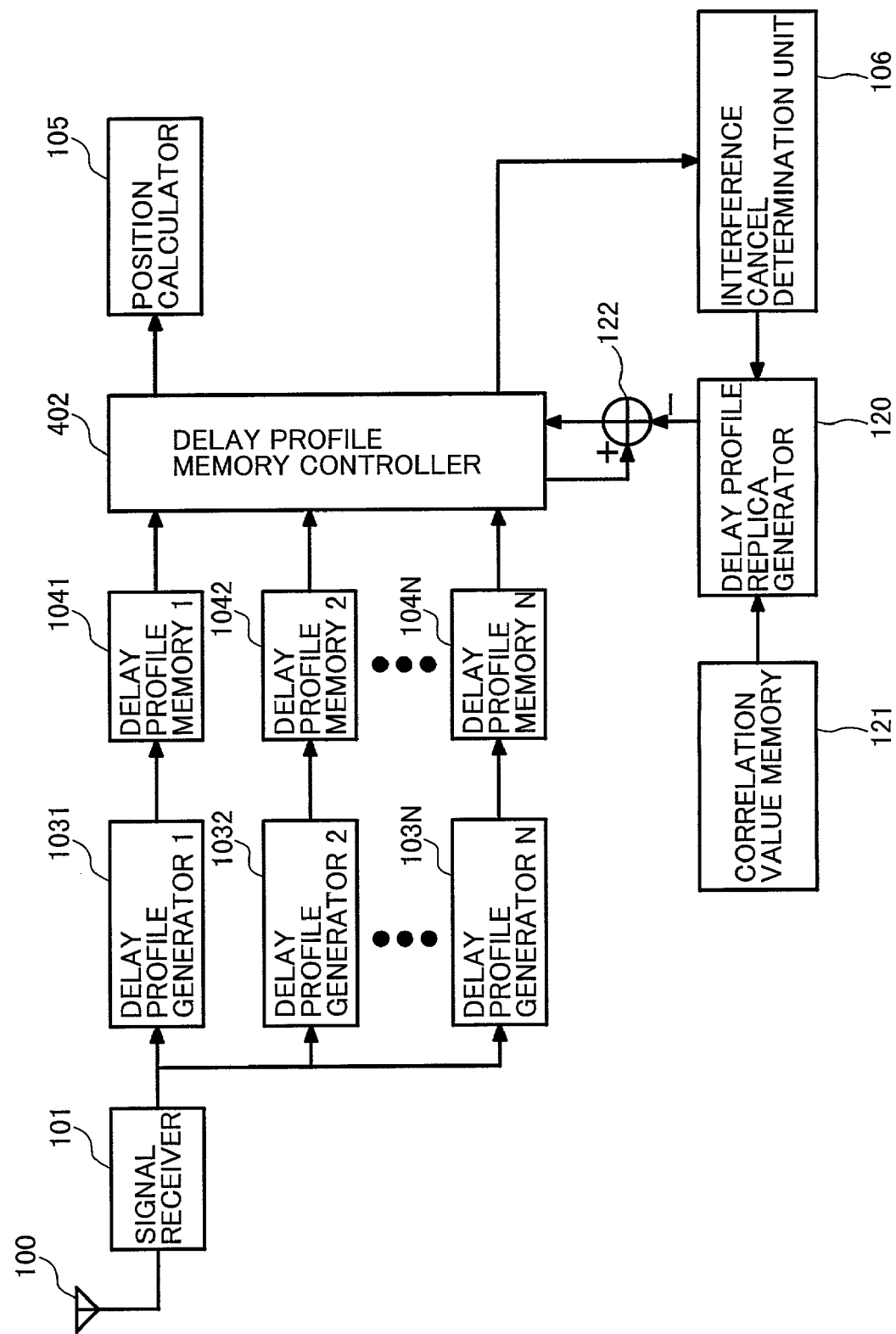
FIG. 10 is a block diagram of a mobile terminal in the third embodiment of the invention.

FIG. 10 shows a block diagram of a mobile terminal in the third embodiment of the invention. In FIG. 10, the same reference numerals are used for the same functional items as those of the mobile terminals in the first embodiment (FIG. 2) and in the second embodiment (FIG. 7).

Signals received from base stations via the antenna 100 are sent to the signal receiver 101. The signal receiver 101 is composed of a radio part (receiver and transmitter), a base band processing part, etc. The radio part performs such receiving processings as amplification, frequency conversion, etc. of high and intermediate signals for cellular signals received from base stations via the antenna 100 and the base band processing part performs such processings as demodulation, AD (Analog to Digital) conversion, etc. of base band signals to generate received signals. Received signals generated by the signal receiver 101 are inputted to corresponding received signal generators 1031 to 103N directly without being stored in the received signal memory.

Each of the delay profile generators 1031 to 103N includes, for example, a matched filter and is enabled to calculate a correlation value between a received signal and a spreading code sequence at each receiving timing to generate a delay profile that denotes a value corresponding to the correlation value.

Delay profiles generated by the delay profile generators 1031 to 103N are written in the delay profile memories 1041 to 104N and retained there. Each of these profile memories 1041 to 104N is corresponded to one of the delay profile generators 1031 to 103N. The delay profiles retained in the delay profile memories 1041 to 104N are read by the position calculator 105 and the interference determination unit 106 via the delay profile memory controller 402, then inputted to the position calculator 105 and the interference determination unit 106 respectively. In other words, the delay profile controller 402 functions just like the delay profile memory controller 302 to decode addresses, so that the position calculator 105, the interference cancel determination unit 106, and the adder 122 in the mobile terminal (FIG. 2) in the first embodiment can handle the delay profile memories 1 to N, each having a V/N[word] address space, as one memory having a V[word] address space.

The interference cancel determination unit 106 uses a delay profile stored in a target delay profile memory (1041 to 104N) to obtain a delay profile power value. Then, the power value is compared with a predetermined threshold value to determine whether to cancel a signal received at a time as an interference one. The same method as that in the mobile terminal in the first embodiment (FIG. 6) can be used for this comparison.

The delay profile replica generator 120, after estimating whether or not a signal output at a timing at which the interference cancel determination unit 106 has determined cancellation of the interference interferes the result of the calculation of the correlation value at another timing, outputs the result. In other words, the delay profile replica generator 120 generates a replica of a target delay profile to be canceled as an interference one.

The correlation value memory 121 stores K correlation values of a spreading code sequence whose cycle is a spreading factor K.

The adder 122 reads a delay profile from a delay profile memory (1041 to 104N) and subtracts the replica of the delay profile calculated by the delay profile replica generator 120 from this delay profile to generate an interference-canceled delay profile, then writes the profile in a delay profile memory (1041 to 104N) again.

The CPU of the position calculator 105 is composed of such elements as a memory required for calculation and performs processings required for position calculation with use of delay profiles retained in the delay profile memory (1041 to 104N) under the control of the software stored in the memory. In other words, the position calculator 105 calculates an interference-canceled delay profile in the same procedure as that of the mobile terminal in the second embodiment (FIG. 7), then uses this delay profile to calculate the current position of the mobile terminal, which is a signal receiving point.

Such way, the mobile terminal in this third embodiment, since it is provided with a plurality of delay profile generators 1031 to 103N, can generate a plurality of delay profiles in parallel, thereby the position calculating time can be reduced. In addition, the mobile terminal, since it is provided with the correlation value memory 121 and the delay profile replica generator 120, can generate a replica of each delay profile with use of a correlation value stored in the correlation value memory 121 and subtract the replica from the delay profile of another base station so as to make interference cancellation that eliminates signal interference from other base stations. It is thus possible to omit the conventional received signal memory to configure the mobile terminal. As a result, the hardware scale, especially the memory capacity of the mobile terminal provided with positioning functions can be reduced to improve the serviceability of position information. In addition, the mobile terminal can be reduced in both size and price.

FIG. 11 shows results of the comparison between the mobile terminal in the third embodiment and the above described conventional mobile terminal more concretely with respect to the estimated values about the number of logic gates, the memory capacity, the position measuring time, and the die size when the logic gates and memories are integrated in an LSI. In the third embodiment, therefore, it would be understood that the LSI die can be reduced in size, thereby the mobile terminal itself can be reduced more in size and the position calculating time can be reduced.

The following are also typical items of the invention other than those described in claims 21 or 22.

In the semiconductor device according to claim 21 or 22, the semiconductor is also provided with correlation value retaining means for retaining correlation values of codes used by the delay profile generating means and the delay profile replica generating means uses a correlation value to generate a replica of each delay profile to be canceled as an interference one.

In the semiconductor device according to claim 21 or 22, the correlation value retaining means retains an autocorrelation value corresponding to a phase difference that is lower than the half of the length of a sequence used by the delay profile generating means to calculate a correlation value. When the delay profile replica generating means uses an autocorrelation value of a phase difference that is lower than the half of the length of a sequence used by the correlation calculation, the correlation value retaining means outputs the autocorrelation value of the phase difference retained in the correlation value retaining means. When the delay profile replica generating means uses an autocorrelation value of a phase difference that is larger than the half of the length of a sequence used by the correlation calculation, the correlation value retaining means outputs the complex conjugate value of the autocorrelation value corresponding to the phase difference obtained by subtracting the phase difference from the sequence length.

In the semiconductor device according to claim 21, the device is provided with delay profile retaining means for retaining a delay profile generated by each of the plurality of delay profile generators and delay profile memory controlling means for controlling input/output of information corresponding to each of the plurality of delay profile retaining means. The delay profile retaining means is composed of a plurality of areas, each being enabled to retain a delay profile generated by one of the plurality of delay profile generating means.

In the semiconductor device according to claim 21 or 22, the device further includes interference cancel determinating means for determining a signal to be canceled as an interference one with use of the delay profile.

The delay profile replica generating means generates a replica of each delay profile determined as an interference one to be canceled by the interference cancel determination means.

In the semiconductor device according to claim 21 or 22, the interference cancel determination means calculates a delay profile power value of each delay profile retained by the delay profile retaining means to determine a signal to be canceled as an interference one according to a result of comparison between the delay profile power value and a predetermined threshold value.

The foregoing invention has been described in terms of preferred embodiments. However, those skilled, in the art will recognized that many variations of such embodiments exist. Such variations are intended to be within the scope of the invention and the appended claims.

What is claimed is:

1. A radio terminal that receives signals from a plurality of radio stations to calculate its current position, comprising:
    delay profile generating means for generating a delay profile of each received signal by calculating correlation values between said received signals and respective PN codes of said radio stations;
    delay profile retaining means for retaining delay profiles generated by said delay profile generating means;
    interference canceling means for canceling an interference component from each of said delay profiles to provide interference-canceled delay profiles; and
    position calculating means for calculating a position that is a signal receiving point with use of said interference-canceled delay profiles retained in said delay profile retaining means.

2. The radio terminal according to claim 1; wherein said interference canceling means comprises: delay profile replica generating means for generating a replica of each delay profile to be canceled as an interference one from said delay profiles; and calculating means for calculating said replica of said delay profile generated by said delay profile replica generating means and each delay profile retained by said delay profile retaining means to thereby cancel the interference component from among said delay profiles.

3. The radio terminal according to claim 2;
    wherein said terminal further includes correlation value retaining means for retaining a correlation value of each code used by said delay profile generating means; and
    wherein said delay profile replica generating means uses said correlation value to generate a replica of each delay profile to be canceled as an interference one.

4. The radio terminal according to claim 3;
    wherein said correlation value retaining means retains an autocorrelation value for each phase difference that is less than the half of the length of a sequence used in calculation of a correlation value by each of said delay profile generating means;
    wherein said correlation value retaining means outputs an autocorrelation value of each phase difference retained by said correlation value retaining means when any of said delay profile replica generating means uses said autocorrelation value that is less than the half of the length of said sequence used in calculation of said correlation value; and
    wherein said correlation value retaining means outputs a complex conjugate of said autocorrelation value corresponding to a phase difference obtained by subtracting said phase difference from said sequence length when said delay profile replica generating means uses said autocorrelation value that is greater than the half of the length of said sequence used in calculation of said correlation value.

5. The radio terminal according to claim 2;
    wherein said terminal further includes interference cancel determining means for determining a signal to be canceled as an interference one with use of said delay profiles; and
    wherein said delay profile replica generating means generates a replica of each delay profile determined so as to be canceled as an interference one by said interference cancel determining means.

6. The radio terminal according to claim 5;
    wherein said interference cancel determining means calculates a delay profile power value of each delay profile retained by said delay profile retaining means to determine a signal to be canceled as an interference one according to a result of comparison between said calculated delay profile power value and a predetermined threshold value.

7. The radio terminal according to claim 1;
    wherein said terminal further includes correlation value retaining means for retaining a correlation value of each code used by said delay profile generating means; and
    wherein said delay profile replica generating means uses said correlation value to generate a replica of each delay profile to be canceled as an interference one.

8. The radio terminal according to claim 7; wherein said correlation value retaining means retains an autocorrelation value for each phase difference that is less than the half of the length of a sequence used in calculation of a correlation value by each of said delay profile generating means; wherein said correlation value retaining means outputs an autocorrelation value of each phase difference retained by said correlation value retaining means when any of said delay profile replica generating means uses said autocorrelation value that is less than the half of the length of said sequence used in calculation of said correlation value; and wherein said correlation value retaining means outputs a complex conjugate of said autocorrelation value corresponding to a phase difference obtained by subtracting said phase difference from said sequence length when said delay profile replica generating means uses said autocorrelation value that is greater than the half of the length of said sequence used in calculation of said correlation value.

9. The radio terminal according to claim 1; wherein said terminal further includes interference cancel determining means for determining a signal to be canceled as an interference one with use of said delay profiles; and wherein said delay profile replica generating means generates a replica of each delay profile determined so as to be canceled as an interference one by said interference cancel determining means.

10. The radio terminal according to claim 9; wherein said interference cancel determining means calculates a delay profile power value of each delay profile retained by said delay profile retaining means to determine a signal to be canceled as an interference one according to a result of comparison between said calculated delay profile power value and a predetermined threshold value.

11. A radio terminal that receives signals from a plurality of radio stations to calculate its current position, comprising:
    a plurality of delay profile generating means for generating delay profiles of said signals received from said plurality of radio stations by calculating correlation values between said received signals and respective PN codes of said radio stations in parallel;
    interference canceling means for canceling an interference component from each of said delay profiles to provide interference-canceled delay profiles; and
    position calculating means for calculating a signal receiving point with use of said interference-canceled delay profiles.

12. The radio terminal according to claim 11; wherein said interference canceling means comprises: delay profile replica generating means for generating a replica of each delay profile to be canceled as an interference one from said delay profiles; and calculating means for calculating a replica of each delay profile generated by said delay profile replica generating means and a delay profile generated by said delay profile generating means to cancel the interference component from among said delay profiles.

13. The radio terminal according to claim 12;
wherein said terminal further includes correlation value retaining means for retaining a correlation value of each code used by said delay profile generating means; and
wherein said delay profile replica generating means uses said correlation value to generate a replica of each delay profile to be canceled as an interference one.

14. The radio terminal according to claim 12;
wherein said correlation value retaining means retains an autocorrelation value corresponding to each phase difference that is less than the half of the length of a sequence used in calculation of said correlation value by said delay profile generating means;
wherein said correlation value retaining means outputs an autocorrelation value of said phase difference retained by said correlation value retaining means when said delay profile replica generating means uses said autocorrelation value of a phase difference that is less than the half of the length of a sequence used in calculation of said correlation value; and
wherein said correlation value retaining means outputs a complex conjugate of an autocorrelation value corresponding to a phase difference obtained by subtracting said phase difference from the length of said sequence when said delay profile replica generating means uses an autocorrelation value of a phase difference that is greater than the half of the length of a sequence used in calculation of said correlation value.

15. The radio terminal according to claim 12;
wherein said terminal further comprises:
delay profile retaining means for retaining delay said plurality of delay profile profiles generated by generating means; and
delay profile memory controlling means for controlling input/output of information to/from said plurality of delay profile retaining means;
wherein said delay profile retaining means is composed of a plurality of areas, each retaining a delay profile generated by each of said plurality of delay profile generating means.

16. The radio terminal according to claim 12;
wherein said terminal further includes interference cancel determining means for determining each signal to be canceled as an interference one with use of said delay profile; and
wherein said delay profile replica generating means generates a replica of each delay profile determined so as to be canceled as an interference one by said interference cancel determining means.

17. The radio terminal according to claim 16
wherein said interference cancel determining means calculates a delay profile power value of each delay profile retained in said delay profile retaining means to determine a signal to be canceled as an interference one according to a result of a comparison between said delay profile power value and a predetermined threshold value.

18. The radio terminal according to claim 11; wherein said terminal further includes correlation value retaining means for retaining a correlation value of each code used by said delay profile generating means; and wherein said delay profile replica generating means uses said correlation value to generate a replica of each delay profile to be canceled as an interference one.

19. The radio terminal according to claim 11; wherein said correlation value retaining means retains an autocorrelation value corresponding to each phase difference that is less than the half of the length of a sequence used in calculation of said correlation value by said delay profile generating means; wherein said correlation value retaining means outputs an autocorrelation value of said phase difference retained by said correlation value retaining means when said delay profile replica generating means uses said autocorrelation value of a phase difference that is less than the half of the length of a sequence used in calculation of said correlation value; and wherein said correlation value retaining means outputs a complex conjugate of an autocorrelation value corresponding to a phase difference obtained by subtracting said phase difference from the length of said sequence when said delay profile replica generating means uses an autocorrelation value of a phase difference that is greater than the half of the length of a sequence used in calculation of said correlation value.

20. The radio terminal according to claim 11; wherein said terminal further comprises: delay profile retaining means for retaining delay profiles generated by said plurality of delay profile generating means; and delay profile memory controlling means for controlling input/output of information to/from said plurality of delay profile retaining means; wherein said delay profile retaining means is composed of a plurality of areas, each retaining a delay profile generated by each of said plurality of delay profile generating means.

21. The radio terminal according to claim 11; wherein said terminal further includes interference cancel determining means for determining each signal to be canceled as an interference one with use of said delay profile; and wherein said delay profile replica generating means generates a replica of each delay profile determined so as to be canceled as an interference one by said interference cancel determining means.

22. The radio terminal according to claim 21; wherein said interference cancel determining means calculates a delay profile power value of each delay profile retained in said delay profile retaining means to determine a signal to be canceled as an interference one according to a result of a comparison between said delay profile power value and a predetermined threshold value.

23. A semiconductor device used for a radio terminal that receives signals from a plurality of radio stations to calculate its current position, comprising:
delay profile generating means for generating a delay profile of each of said received signals with use of said received signals;
delay profile retaining means for retaining delay profiles generated by said plurality of delay profile generating means;
delay profile replica generating means for generating a replica of each delay profile to be canceled as an interference one from said delay profiles;
calculating means for calculating a replica of each delay profile generated by each of said delay profile replica generating means with use of delay profiles retained in said delay profile retaining means to cancel the interference component from among said delay profiles; and
position calculating means for calculating a position that is a signal receiving point with use of interference-canceled delay profiles retained in said delay profile retaining means.

24. A semiconductor device used for a radio terminal that receives signals from a plurality of radio stations to calculate its current position, comprising:

a plurality of delay profile generating means for generating delay profiles of signals received from said plurality of radio stations in parallel with use of their corresponding codes;

delay profile replica generating means for generating a replica of each delay profile to be canceled as an interference one from said plurality of delay profiles;

calculating means for calculating a replica of each delay profile generated by said delay profile replica generating means and a delay profile generated by said delay profile generating means to cancel the interference component from among said plurality of delay profiles; and position calculating means for calculating a position that is a signal receiving point with use of interference-canceled delay profile.

* * * * *